United States Patent
Baek et al.

(10) Patent No.: US 9,930,718 B2
(45) Date of Patent: Mar. 27, 2018

(54) METHOD AND APPARATUS FOR SWITCHING DATA PATH IN WIRELESS COMMUNICATION SYSTEM SUPPORTING DEVICE-TO-DEVICE COMMUNICATION

(71) Applicant: Samsung Electronics Co., Ltd, Gyeonggi-do (KR)

(72) Inventors: Sangkyu Baek, Gyeonggi-do (KR); Youngbin Chang, Gyeonggi-do (KR); Hyunjeong Kang, Seoul (KR); Kyungkyu Kim, Gyeonggi-do (KR); Seunghoon Park, Seoul (KR); Sungjin Lee, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 50 days.

(21) Appl. No.: 14/916,171

(22) PCT Filed: Sep. 1, 2014

(86) PCT No.: PCT/KR2014/008153
§ 371 (c)(1),
(2) Date: Mar. 2, 2016

(87) PCT Pub. No.: WO2015/030557
PCT Pub. Date: Mar. 5, 2015

(65) Prior Publication Data
US 2016/0198518 A1   Jul. 7, 2016

(30) Foreign Application Priority Data
Sep. 2, 2013   (KR) .......... 10-2013-0104591

(51) Int. Cl.
*H04W 4/00*   (2009.01)
*H04W 76/04*   (2009.01)
(Continued)

(52) U.S. Cl.
CPC ......... *H04W 76/043* (2013.01); *H04W 8/005* (2013.01); *H04W 24/10* (2013.01); *H04W 48/16* (2013.01); *H04W 76/046* (2013.01)

(58) Field of Classification Search
CPC . H04W 76/043; H04W 24/10; H04W 76/046; H04W 8/005; H04W 48/16
(Continued)

(56) References Cited

U.S. PATENT DOCUMENTS

| 2007/0129076 A1 | 6/2007 | Cho et al. |
| 2007/0153747 A1 | 7/2007 | Pan et al. |

(Continued)

FOREIGN PATENT DOCUMENTS

| KR | 10-2007-0059873 | 6/2007 |
| KR | 10-2009-0005601 | 1/2009 |

(Continued)

OTHER PUBLICATIONS

International Search Report dated Dec. 4, 2014 in connection with International Patent Application No. PCT/KR2014/008153, 5 pages.
(Continued)

*Primary Examiner* — Mang Yeung

(57) ABSTRACT

The present invention relates to a method and an apparatus for switching a data path in a wireless communication system supporting device-to-device (D2D) communication. The method for switching a path of a base station in a wireless communication system supporting device-to-device communication, according to the present invention, comprises the steps of: receiving, from a first terminal, a measurement report including a D2D identifier of a second terminal that performs a direct communication with the first terminal; sending a query to a D2D server for a network identifier corresponding to the D2D identifier of the second terminal; and determining whether to switch a direct path
(Continued)

between the first terminal and the second terminal to a local path on the basis of the network identifier of the second terminal obtained from the D2D server.

14 Claims, 11 Drawing Sheets

(51) Int. Cl.
  *H04W 24/10* (2009.01)
  *H04W 8/00* (2009.01)
  *H04W 48/16* (2009.01)
(58) Field of Classification Search
  USPC .......................................................... 370/329
  See application file for complete search history.

(56) References Cited

U.S. PATENT DOCUMENTS

| | | | |
|---|---|---|---|
| 2010/0260101 A1 | 10/2010 | Tsirtsis et al. | |
| 2010/0279672 A1* | 11/2010 | Koskela | H04W 36/30 455/418 |
| 2013/0244661 A1* | 9/2013 | Lin | H04W 76/023 455/436 |
| 2014/0185587 A1 | 7/2014 | Jang et al. | |
| 2014/0328310 A1* | 11/2014 | Xu | H04W 76/023 370/329 |
| 2015/0004984 A1 | 1/2015 | Kim et al. | |
| 2015/0271859 A1* | 9/2015 | Huang | H04W 72/12 370/329 |
| 2015/0334757 A1* | 11/2015 | Seo | H04W 76/023 370/329 |
| 2016/0007259 A1* | 1/2016 | Fukuta | H04W 36/24 455/437 |
| 2017/0290025 A1* | 10/2017 | Fukuta | H04W 72/085 |

FOREIGN PATENT DOCUMENTS

| | | |
|---|---|---|
| KR | 10-2011-0031097 | 3/2011 |
| WO | WO 2013/032259 A2 | 3/2013 |
| WO | WO 2013/109040 A1 | 7/2013 |

OTHER PUBLICATIONS

Written Opinion of the International Searching Authority dated Dec. 4, 2014 in connection with International Patent Application No. PCT/KR2014/008153, 6 pages.

* cited by examiner

METHOD AND APPARATUS FOR SWITCHING DATA PATH IN WIRELESS COMMUNICATION SYSTEM SUPPORTING DEVICE-TO-DEVICE COMMUNICATION

CROSS-REFERENCE TO RELATED APPLICATION(S)

The present application claims priority under 35 U.S.C. § 365 to International Patent Application No. PCT/KR2014/008153 filed Sep. 1, 2014, entitled "METHOD AND APPARATUS FOR SWITCHING DATA PATH IN WIRELESS COMMUNICATION SYSTEM SUPPORTING DEVICE-TO-DEVICE COMMUNICATION", and, through International Patent Application No. PCT/KR2014/008153, to Korean Patent Application No. 10-2013-0104591 filed Sep. 2, 2013, each of which are incorporated herein by reference into the present disclosure as if fully set forth herein.

TECHNICAL FIELD

The present invention relates to wireless communication systems for supporting device-to-device (D2D) communication, and more specifically, to a method and an apparatus for switching between data paths in a wireless communication system for supporting D2D communication.

BACKGROUND ART

With the evolution of mobile services, various types of service models for using smartphones have recently appeared. As an example, a service provided based on a user's proximity uses a cellular network; however, using a cellular network may cause data congestion as the number of users increases.

In order to resolve the problem, device-to-device (D2D) communication technology using proximity of communication devices has been attracting attention in recent years.

In cellular networks configured to support D2D communication, devices may perform D2D communication, i.e., communication via a direct path, in order to use efficient wireless resources, and this may increase the overall throughput of networks. However, when communication devices are relatively far apart from each other, the performance of a wireless channel is lowered and D2D communication may not be efficient. In this case, it is effective to communicate via a default path of a cellular network.

When devices communicate with the same eNB via the default path, transmission of data packets through a cellular network may increase unnecessary traffic in the network. In order to resolve the problem, there may be a need for communication via a local path on which an eNB serves as a relay for D2D communication without passing through a network.

Therefore, there is a need to adaptively switch a device-to-device communication path to either a direct communication path or a local communication path between devices.

DISCLOSURE OF INVENTION

Technical Problem

The present invention was devised in view of the above problems, and provides a method and an apparatus for switching between paths in a wireless communication system for supporting device-to-device (D2D) communication.

The present invention further provides a method for an eNB (base station) to pair a D2D ID with an ID used in a cellular network and to switch a data path from a device-to-device (D2D) direct path to a local path or from a local path to a direct path.

Solution to Problem

In accordance with an embodiment of the present invention, the present invention provides a method for a base station to switch between paths in a wireless communication system configured to support device-to-device (D2D) communication including: receiving, from a first terminal, a measurement report including a D2D identification (D2D ID) of a second terminal that performs D2D communication with the first terminal; querying a D2D server regarding a network Identification (ID) corresponding to the D2D ID of the second terminal; and determining whether to switch a direct path to a local path between the first and second terminals, based on the network ID of the second terminal, obtained from the D2D server.

In accordance with another embodiment of the present invention, the present invention provides a method for a base station to switch between paths in a wireless communication system configured to support device-to-device (D2D) communication including: receiving, from a first terminal, a first measurement report including a D2D identification (D2D ID) of a second terminal that performs D2D communication with the first terminal, and an D2D ID of the first terminal; receiving, from the second terminal, a second measurement report including the D2D ID of the first terminal, and the D2D ID of the second terminal; and determining whether to switch a direct path to a local path between the first and second terminals, based on the first and second measurement reports.

In accordance with another embodiment of the present invention, the present invention provides a method for a terminal to switch between paths in a wireless communication system configured to support device-to-device (D2D) communication including: communicating with a correspondent terminal via a direct path; obtaining an identification of a base station (base station ID) in connection with the terminal; transmitting, to the correspondent terminal, a local path test message including the base station ID; transmitting a measurement report to the base station, when receiving, from the correspondent terminal, a local path confirmation response message in response to the local path test message; and switching the direct path to a local path, when receiving, from the base station, a Radio Resource Control (RRC) connection re-configuration message instructing to switch the direct path to a local path.

In accordance with another embodiment of the present invention, the present invention provides a method for a base station to switch between paths in a wireless communication system configured to support device-to-device (D2D) communication including: providing a local path for communication between first and second terminals; transmitting, to a mobile management entity (MME), a D2D capability request message including network identifications (network IDs) of the first and second terminals, when determining to switch the local path to a direct path between the first and second terminals; receiving, from the MME, a D2D capability notification message including D2D IDs of the first and second terminals, in response to the transmission of the D2D capability request message; and switching the local path to a direct path, based on the D2D IDs of the first and second terminals.

In accordance with another embodiment of the present invention, the present invention provides a base station for controlling path switching in a wireless communication system configured to support device-to-device (D2D) communication including: a transceiver for transmitting/receiving signals to/from a node of the wireless communication system or terminals; and a controller for: receiving, from a first terminal, a measurement report including a D2D identification (D2D ID) of a second terminal that performs D2D communication with the first terminal; querying a D2D server regarding a network Identification (ID) corresponding to the D2D ID of the second terminal; determining whether to switch a direct path to a local path between the first and second terminals, based on the network ID of the second terminal, obtained from the D2D server; matching the network ID of the second terminal with the D2D ID of the second terminal and storing the matching result; and transmitting, to the first and second terminals, a Radio Resource Control (RRC) connection re-configuration message instructing to switch the direct path to a local path.

In accordance with another embodiment of the present invention, the present invention provides a base station for controlling path switching in a wireless communication system configured to support device-to-device (D2D) communication including: a transceiver for transmitting/receiving signals to/from a node of the wireless communication system or terminals; and a controller: for receiving, from a first terminal, a first measurement report including a D2D identification (D2D ID) of a second terminal that performs D2D communication with the first terminal, and a D2D ID of the first terminal; receiving, from the second terminal, a second measurement report including the D2D ID of the first terminal, and the D2D ID of the second terminal; and determining whether to switch a direct path to a local path between the first and second terminals, based on the first and second measurement reports.

In accordance with another embodiment of the present invention, the present invention provides a terminal for switching between paths in a wireless communication system configured to support device-to-device (D2D) communication including: a transceiver for transmitting/receiving signals to/from a base station or a correspondent terminal; and a controller for: communicating with the correspondent terminal via a direct path; obtaining an identification of a base station (base station ID) in connection with the terminal; transmitting, to the correspondent terminal, a local path test message including the base station ID; transmitting a measurement report to the base station, when receiving, from the correspondent terminal, a local path confirmation response message in response to the local path test message; and switching the direct path to a local path, when receiving, from the base station, a Radio Resource Control (RRC) connection re-configuration message instructing to switch the direct path to a local path. The local path confirmation response message is received from the correspondent terminal when a base station ID stored in the correspondent terminal is identical to a base station ID stored in the local path test message. The measurement report sets the D2D ID of the terminal to a source and the D2D ID of the correspondent terminal to a destination.

In accordance with another embodiment of the present invention, the present invention provides a base station for controlling path switching in a wireless communication system configured to support device-to-device (D2D) communication including: a transceiver for transmitting/receiving signals to/from a node of the wireless communication system or terminals; and a controller for: providing a local path for communication between first and second terminals; transmitting, to a mobile management entity (MME), a D2D capability request message including network identifications (network IDs) of the first and second terminals, when determining to switch the local path to a direct path between the first and second terminals; receiving, from the MME, a D2D capability notification message including D2D IDs of the first and second terminals, in response to the transmission of the D2D capability request message; switching the local path to a direct path, based on the D2D IDs of the first and second terminals; instructing the first and second terminals to measure the D2D channels of the first and second terminals, based on the D2D IDs of the first and second terminals, and to report the measurements; and determining to switch the local path to a direct path, based on the measurement reports transmitted from the first and second terminals, according to the instruction.

Advantageous Effects of Invention

The present invention enables an eNB (base station) to identify user equipment (UE) and the involved links when switching between a direct path and a local path to perform a device-to-device (D2D) communication, thereby efficiently switching between communication paths.

MODE FOR INVENTION

Embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the invention.

The following description is provided regarding a method for an eNB (base station) to pair a D2D ID with an ID used in a cellular network (hereafter also called a 'network ID') and to switch between data communication paths.

In the process of direct path communication between devices (terminals), one device (terminal) needs its own identifier (ID) and the correspondent device's (terminal's) identifier (ID) for the data link layer. In an LTE network, examples of the identifier for the data link layer are Cell Radio Network Temporary identifier (C-RNTI), Globally Unique Temporary Identifier (GUTI), International Mobile Subscriber Identity (IMSI), etc.

However, since direct path communication is performed between devices, when the devices use the identifiers controlled by networks, such as C-RNTI, GUTI, IMSI, etc., various problems, such as security issues, etc., may occur. Therefore, direct path communication needs another type of ID.

As an embodiment of the present invention, the method is implemented in such a way that a D2D server configured to control D2D communication allocates an ID for direct path communication, i.e., an ID for D2D communication (hereafter called a 'D2D ID'). The D2D server may be a new node of a cellular network or any node of conventional cellular networks.

On a local path, a base station or a local gateway receives packets from one terminal and transmits the packets to another terminal. Therefore, the base station is similar to existing cellular communications that control a wireless connection between a terminal and a base station. However, the local path differs from a default path because the local path receives packets from a terminal and directly transmits the received packets to the correspondent terminal without passing through a core network. These reasons allow a local path to use IDs used in existing networks for communication.

When a packet transmission path needs to be switched from a direct path to a local path, a base station needs to know IDs (e.g., C-RNTI, IMSI, etc.) that the terminal uses in a cellular network, corresponding to the D2D ID. More specifically, the terminal has an ID used for a cellular network; however the base station does not know the correlation between the cellular ID and the D2D ID of the terminal. Therefore, the base station needs to find out the correlation.

The present invention provides a method for a base station to pair a D2D ID with an ID used for a cellular network and to switch between paths.

Figure 1:
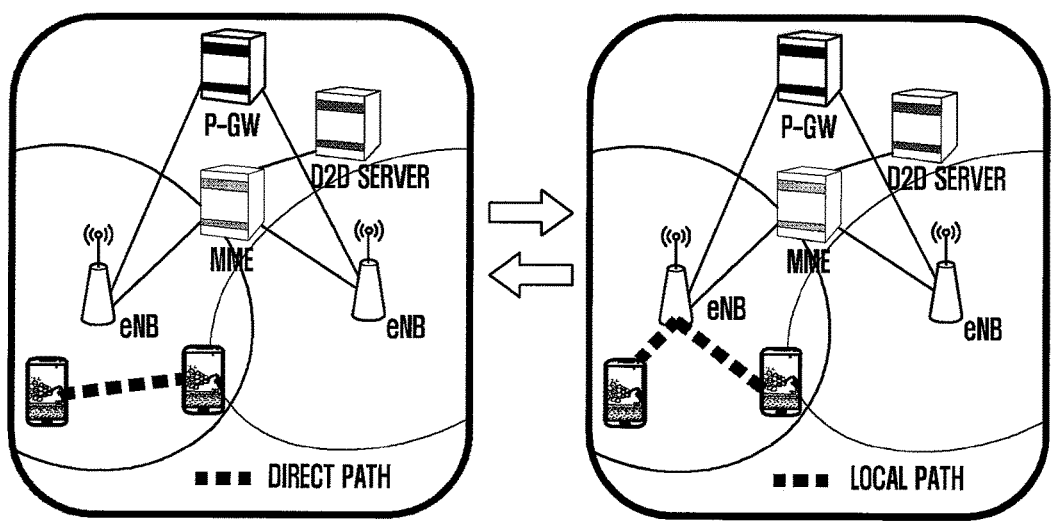
FIG. 1 shows diagrams of a direct path and a local path from among the device-to-device (D2D) communication paths.

FIG. 1 shows diagrams of a direct path and a local path from among the device-to-device (D2D) communication paths.

A direct path refers to a path allowing for direct transmission/reception of data packets between user equipment (UE) devices, without using an eNB, a core node, etc., in a cellular network. A local path refers to a path allowing for transmission/reception of data packets between one UE device and the correspondent UE device, passing through an eNB on a cellular network, but not through a core node.

The present invention deals with problems arising when switching between a direct path and a local path. A local path may be supported in a cellular network or by using the Local Break Out (LBO). When UE devices are connected to the same eNB, a local path allows the eNB to serve as a forwarder in D2D communication, without following a default path for cellular communication.

For a network supporting D2D communication, the D2D server may be located on an existing cellular network. In this case, the D2D server is capable of performing at least one of the following functions: D2D discovery, management of Direct Communication or Direct Path Communication, resource allocation, and allocation of D2D ID. It is also preferable to perform one or more functions of the D2D server. The D2D server may be a new node of a cellular network or any node of conventional cellular networks.

Figure 2:
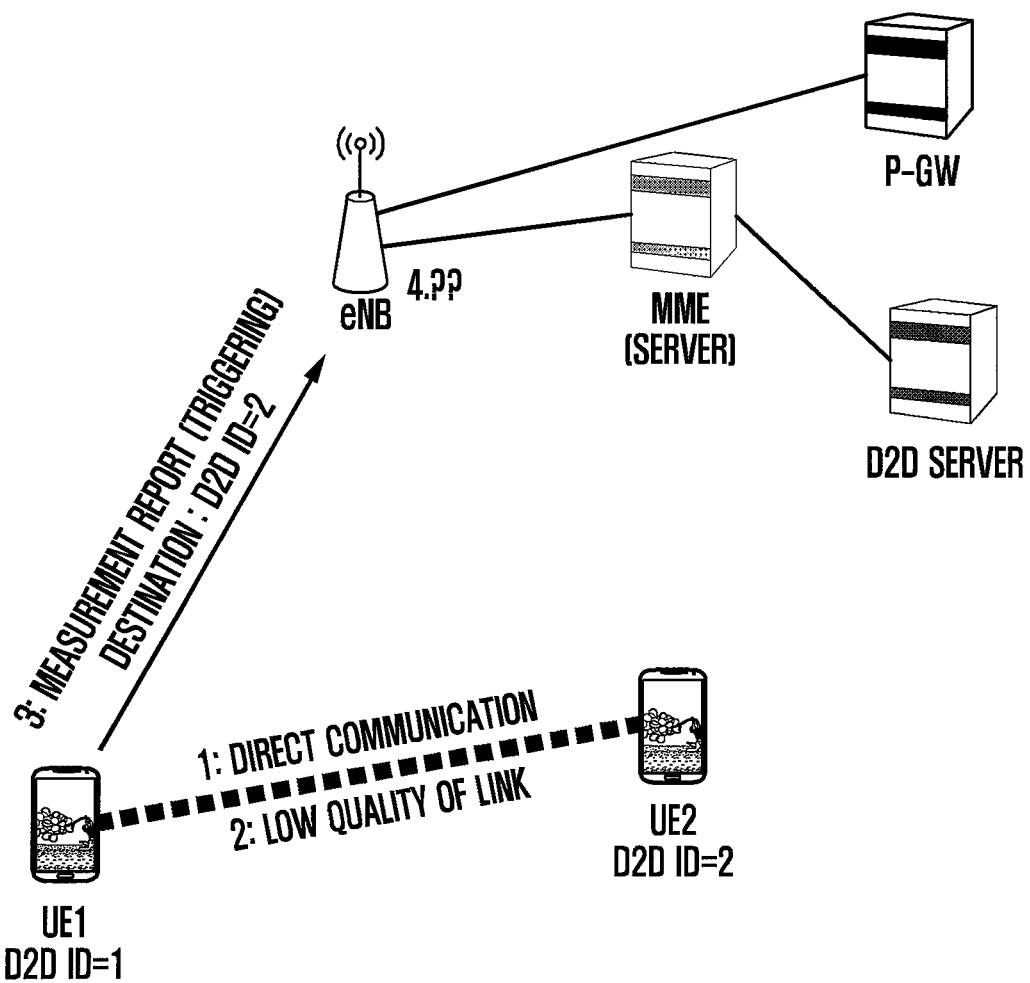
FIG. 2 is a diagram that describes a method for user equipment (UE) devices, configured to make a direct communication, to switch a data packet transmitting/receiving path to a local path or a default path.

FIG. 2 is a diagram that describes a method for user equipment (UE) devices, configured to perform direct communication, to switch a data packet transmitting/receiving path to a local path or a default path.

UE1 and UE2 are performing direct path communication with each other by using their D2D IDs in operation 1.

When the wireless link quality of the direct path is lowered as in operation 2, UE makes a request to switch the direct path to a local path or a default path to keep the service continuity. According to embodiments of the present invention, since a local path does not generate an unnecessary network traffic, compared with a default path. Therefore, it may be proper to request a local path, first, from the point of view of a system; however, the present invention is not limited thereto.

UE needs to inform the eNB of the status of communication with the correspondent UE. To this end, UE informs the eNB of information regarding the correspondent UE, using the D2D ID of the correspondent UE.

However, since the eNB does not manage D2D IDs of UE devices, it is not capable of identifying UE through only a D2D ID of UE (e.g., C-RNTI, IMSI, etc., used in a network). In addition, since direct path communication may be performed when UE and an eNB are in RRC-idle state, not RRC-Connected state, the eNB does not know the D2D ID and the network ID of the UE.

Therefore, a process is required to pair a UE's D2D ID with a UE's ID used in a network (e.g., C-RNTI, IMSI, EPS Bearer ID, etc.).

Figure 3:
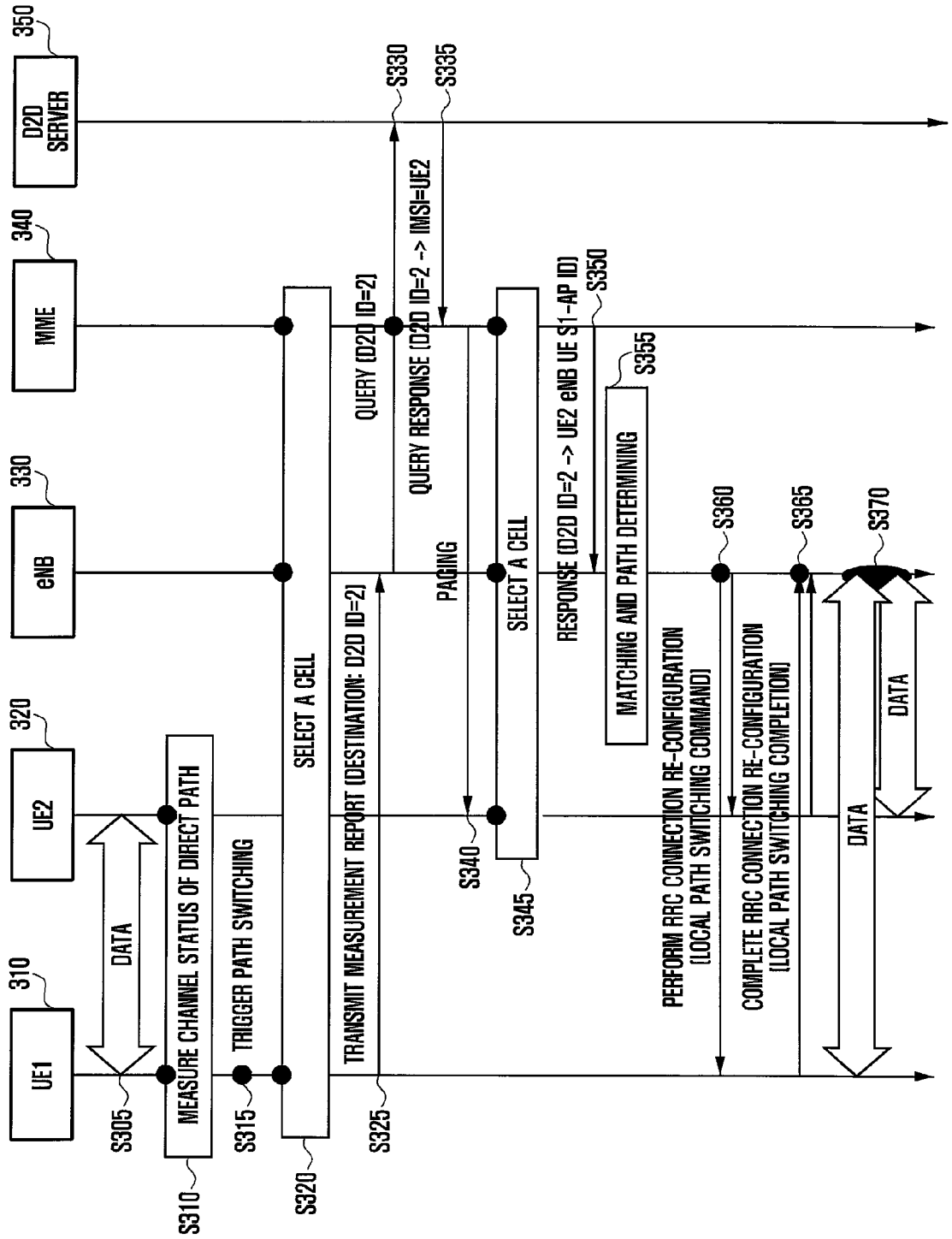
FIG. 3 is a flow diagram that describes a data packet path switching method according to an embodiment of the present invention.

FIG. 3 is a flow diagram that describes a data packet path switching method according to an embodiment of the present invention.

FIG. 3 is a detailed flow diagram showing a method for an eNB to convert a D2D ID of UE to a network ID.

A first UE device, UE1, indicated by reference number 310, and a second UE device, UE2, indicated by reference number 320, communicate with each other via a direct path in operation S305.

UE1 or UE2 measures a channel status of the direct path in operation S310. The UE receives resources and period triggering conditions for path measurement from an eNB or a D2D server via a message, Direct Path Measurement Control, and performs path measurement under the received conditions. The Direct Path Measurement Control message may be transmitted along with existing messages, such as RRC or NAS, etc., or may be implemented as an independent message.

UE1 or UE2 determines whether a preset measurement report satisfies a triggering condition in operation S315. When a preset measurement report satisfies a triggering condition in operation S315, the UE1 or UE2 needs to report a measurement result of the current channel status of a direct path to the eNB. In the embodiment, it is assumed that UE1 reports a measurement to the eNB 330.

When UE is disconnected with eNBs (e.g., RRC-Idle in LTE) to reduce power consumption, it selects an eNB and is connected with the eNB (e.g., RRC-Connected) in operation S320, and transmits a Measurement Report to the serving eNB 330 in operation S325.

In the embodiment, the Measurement Report is transmitted to the eNB, containing the D2D ID of the correspondent UE communicating through a direct path, i.e., the D2D ID of UE2.

When receiving the measurement report from the UE, the eNB 330 transmits a query message, Query, to the D2D server 350 in order to obtain a network ID (or a cell ID) corresponding to the D2D ID in operation S330.

After receiving the query message from the eNB 330, the D2D server 350 transmits its stored network ID to the eNB 330 or receives corresponding information from an entity that contains the D2D ID and the network ID and then transmits the query response, Query Response, to the eNB 330 in operation S335.

When the correspondent UE (e.g., UE2) is disconnected with the eNB 330, the MME 340 performs a paging process for the UE in operation S340, and the UE enters a connection state with the eNB 330 in operation S345.

According to an embodiment, the eNB may not have included a network ID (e.g., IMSI) of the correspondent UE 320 (UE2) that the D2D server 350 has known. In this case, the D2D server 350 may request the MME 340 to convert a network ID that the D2D server has known into a network ID of the UE that the eNB has known in operation S350.

The MME 340 may transmit, to the eNB 330, a network ID of the UE that the eNB 330 has known. In LTE, an example of the network ID may be an eNB UE S1-AP ID.

Meanwhile, when both all the UE devices are in a connection state; however they cannot perform local path communication (e.g., when the UE devices are not in the coverage of the same eNB or the D2D server determines that it is not proper to support a local path), a response message to a query message may include a bit indicator as information indicating that a local path is unavailable.

The eNB 330 receives the D2D ID of the corresponding UE 320 and the corresponding network ID of the UE via the response message and matches them with each other in operation S355. In the embodiment, the matched result may be stored in the eNB. The eNB 330 determines whether it switches a direct path to a local path in operation S355.

As described above, the eNB 330 may determine whether it switches between paths of UE1 and UE2. The eNB 330 may also determine whether it switches a path to a local path, based on the channel status between each of the UE1 and UE2 and the eNB 330, etc.

When the eNB 330 determines to switch a direct path to a local path, it is capable of transmitting, to the UE1 and UE2, an RRC connection re-configuration message including a command for switching to a local path in operation S360. In that case, the UE1 and/or UE2 transmit, to the eNB 330, an RRC connection re-configuration completing message containing information that local path switching has been completed in operation S365.

In that case, the UE1 and UE2 are capable of transmission/reception of data packets via a local path passing through the eNB 330.

Figure 4:
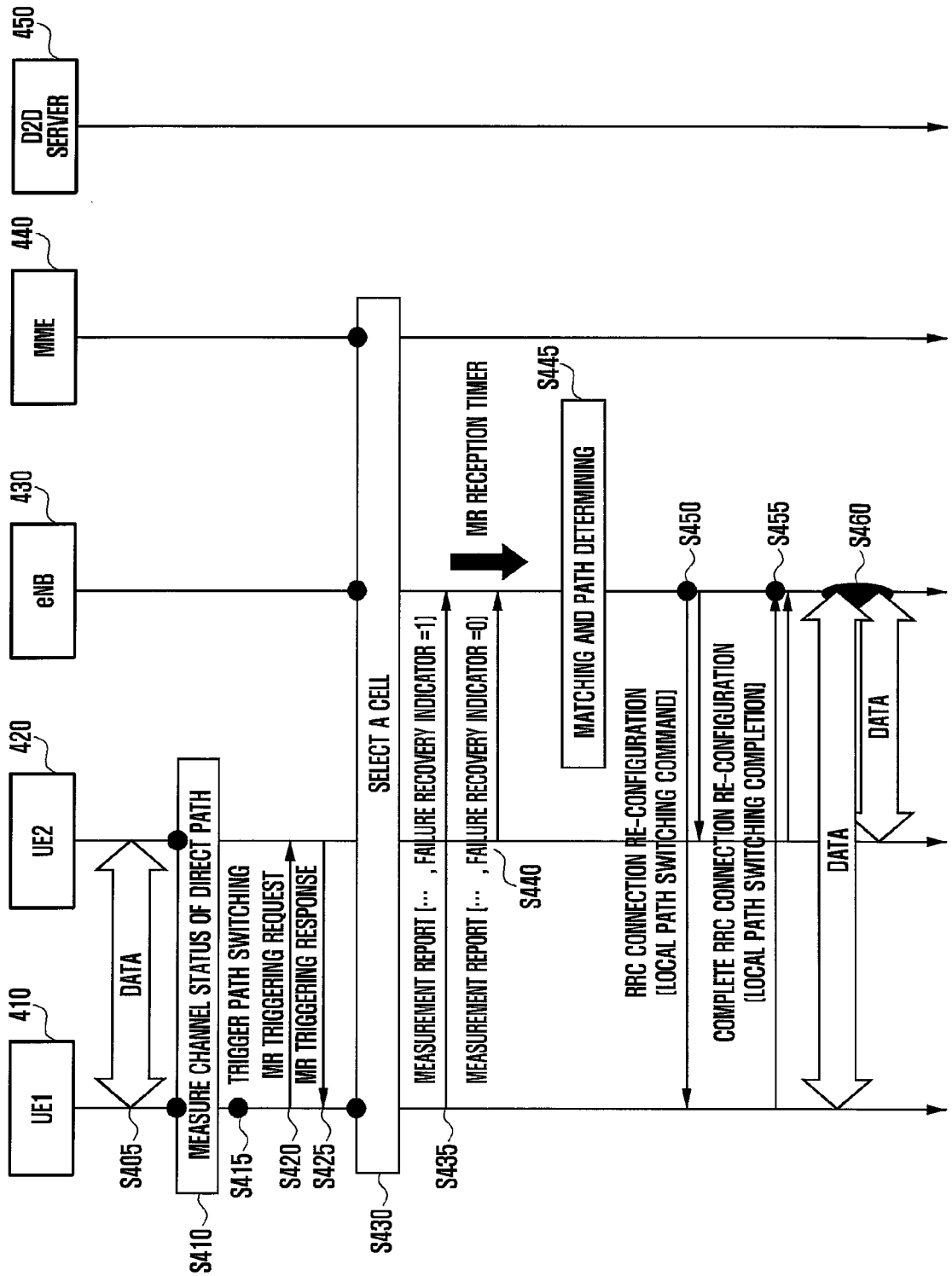
FIG. 4 is a flow diagram that describes a data packet path switching method according to another embodiment of the present invention.

FIG. 4 is a flow diagram that describes a data packet path switching method according to another embodiment of the present invention.

A first UE device, UE1, indicated by reference number 410, and a second UE device, UE2, indicated by reference number 420, communicate with each other via a direct path in operation S405.

UE1 or UE2 measures a channel status of the direct path in operation S410. The UE receives resources and period triggering conditions for path measurement from the eNB or a D2D server via a message, Direct Path Measurement Control, and performs path measurement under the received conditions. The Direct Path Measurement Control message may be transmitted along with existing messages, such as RRC or NAS, etc., or may be implemented as an independent message. UE1 or UE2 determines whether a preset measurement report satisfies a triggering condition in operation S415. When a preset measurement report satisfies a triggering condition in operation S415, the UE1 and UE2 transmit the channel status of the direct path to the eNB in operation S435.

During the process, in order to prevent a delay time due to paging, the UE1 and UE2 exchanges a measurement report triggering request, MR Triggering Request, and a measurement report triggering response, MR Triggering Response, with each other in operations S420 and S425. When the UE1 and UE2 are both in an idle state, RRC-Idle, they may enter a connection state with the eNB, RRC-Connected. The processes related to the measurement report triggering request and measurement report triggering response may also be applied to the embodiment shown in FIG. 3.

In the embodiment shown in FIG. 4, UE1 and UE2 transmit their measurement reports to the serving eNB 430. In the embodiment, the Measurement Report may contain a measured, channel status, a D2D ID of UE, and a D2D ID of the correspondent UE. For example, a measurement report transmitted by UE1 contains a D2D ID of the UE1 as a source D2D ID, and a D2D ID of the UE2 as a destination D2D ID. Similarly, a measurement report transmitted by UE2 contains a D2D ID of the UE2 as a source D2D ID, and a D2D ID of the UE1 as a destination D2D ID.

When the eNB 430 receives a measurement report from at least one of the UE1 and UE2, it may operate a measurement report reception timer (MR Reception Timer) to receive a measurement report from the other UE that has not transmitted a measurement report. When the eNB 430 has received measurement reports from the two UE devices before the MR Reception Timer has expired, it is capable of determining whether the network IDs of the respective UE devices are linked to a direct path using the D2D IDs. On the other hand, when the eNB 430 has not received a measurement report from the correspondent UE device until the MR Reception Timer has expired, it is capable of stopping a path switching process to a local path.

According to an embodiment, when a path switching process to a local path has failed and the channel status value of the direct path is less than or equal to a threshold, the path may be switched to a default path.

In the embodiment, the Measurement Report may contain a Failure Recovery Initiator. The failure recovery initiator may be implemented with one bit or in a form of codes. The value indicated by the failure recovery indicator refers to information that is used: to set, when the eNB 430 received only one measurement report, a path to a default path, not to a local path; and to designate an operator for setting the default path (e.g., an entity in charge of setting the default path, etc.). It should be understood that the failure recovery indicator is an optional feature in the embodiment, or not necessarily required for the embodiment shown in FIG. 4.

The eNB 430 matches information items contained in the measurement reports received from the UE1 and UE2, e.g., source D2D IDs and destination D2D IDs in the individual measurement reports, with each other, in operation S445. Afterwards, the eNB 430 determines whether it switches a direct path to a local path.

When the eNB 430 determines to switch a direct path to a local path, it is capable of transmitting, to the UE1 and UE2, an RRC connection re-configuration message including a command for switching to a local path in operation S450. In that case, the UE1 and/or UE2 transmit, to the eNB 430, an RRC connection re-configuration completing message containing information that local path switching has been completed in operation S455.

In that case, the UE1 and UE2 are capable of transmission/reception of data packets via a local path passing through the eNB 430.

Figure 5:
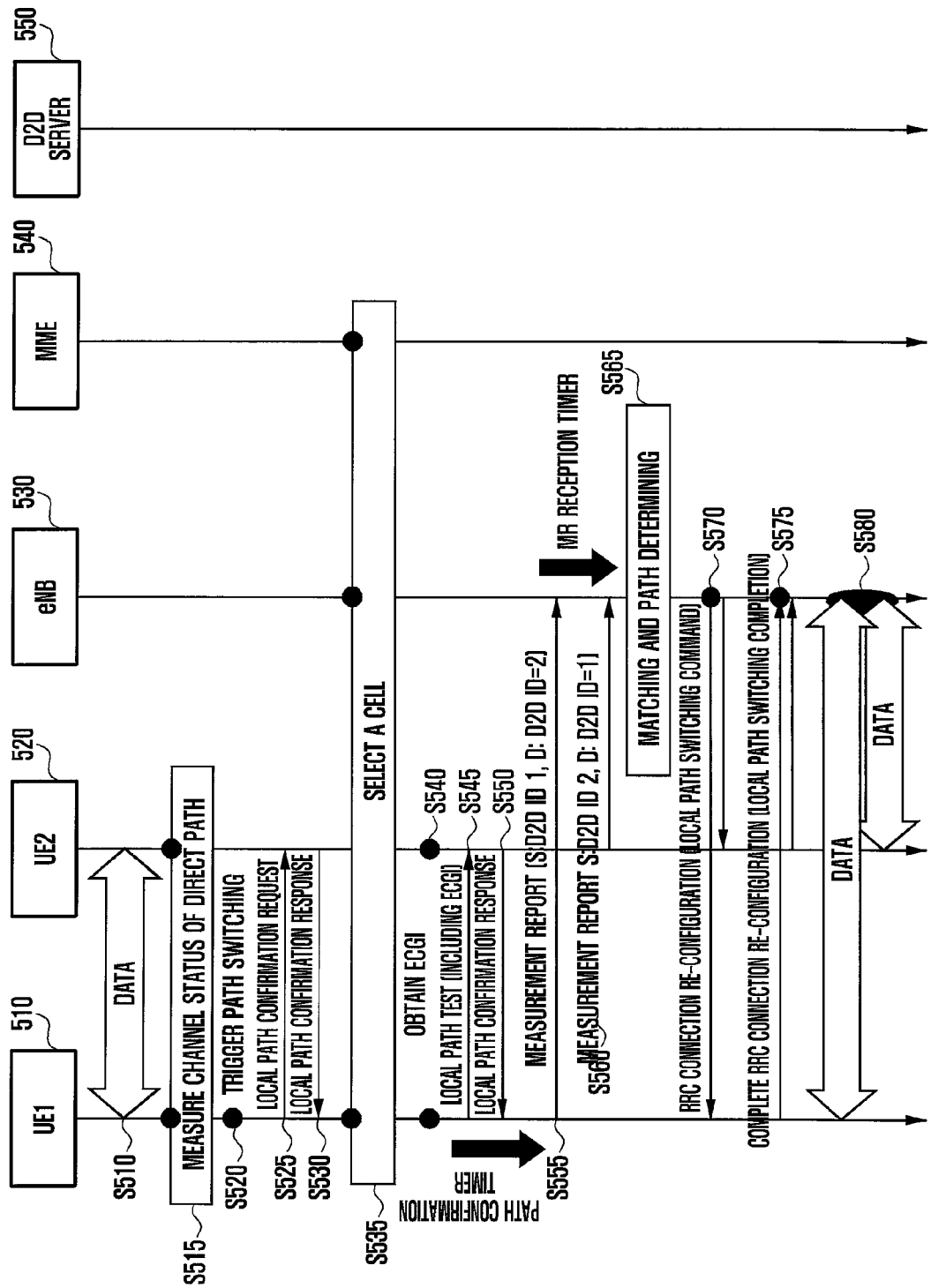
FIG. 5 is a flow diagram that describes a data packet path switching method according to another embodiment of the present invention.

FIG. 5 is a flow diagram that describes a data packet path switching method according to another embodiment of the present invention.

A first UE device, UE1, indicated by reference number 510, and a second UE device, UE2, indicated by reference number 520, communicate with each other via a direct path in operation S510.

UE1 or UE2 measures a channel status of the direct path in operation S515. The UE receives resources and period triggering conditions for path measurement from the eNB or a D2D server via a message, Direct Path Measurement Control, and performs path measurement under the received conditions. The Direct Path Measurement Control message may be transmitted along with existing messages, such as RRC or NAS, etc., or may be implemented as an independent message.

UE1 or UE2 determines whether a preset measurement report satisfies a triggering condition in operation S520.

When a preset measurement report satisfies a triggering condition in operation S520, the UE1 and UE2 trigger a path switching. After triggering a path switching, the UE1 transmits a local path confirmation request to the UE2 to confirm the local path in operation S525.

The UE2 transmits the local path confirmation response to the UE1 in operation S530. In that case, the UE1 and UE2 enter an RRC connection state in operation S535.

When the UE1 and UE2 operate in an RRC connection state, the embodiment may be implemented without operations S525, S530, and S535.

When the UE1 and UE2 enter an RRC connection state, they are capable of obtaining eNB IDs (e.g., ECGI) respectively, in operation S540. When the UE1 and UE2 have been in an RRC connection state, they will have been equipped with the connected, eNB IDs, respectively.

After that, the UE1 is capable of transmitting, to the UE2, a local path test message containing an eNB ID (ECGI) that the UE1 has connected to, in operation S545. The UE2, as a correspondent UE, determines whether the eNB ID transmitted from the UE1 is identical to the ID of an eNB that the UE2 has connected to.

When the eNB ID transmitted from the UE1 is identical to the ID of an eNB that the UE2 has connected to, the UE2 transmits a local path confirmation response to the UE1 in operation S550.

In the embodiment, the UE1 transmits a local path test message to the UE2, and then operates a path confirmation timer. When the UE1 does not receive a local path confirmation response from the UE2 until the path confirmation timer has expired, the UE1 may independently request to independently switch between paths.

When the UE1 and UE2 are connected to the same eNB, the UE1 and UE2 are capable of transmitting the respective measurement reports to the serving eNB 530.

The method of transmitting measurement reports is similar to the embodiment shown in FIG. 4.

UE1 and UE2 transmit their measurement reports to the serving eNB 430 in operations S555 and S560 respectively. In the embodiment, the Measurement Report may contain a measured, channel status, a D2D ID of UE, and a D2D ID of the correspondent UE. For example, a measurement report transmitted by UE1 contains a D2D ID of the UE1 as a source D2D ID, and a D2D ID of the UE2 as a destination D2D ID. Similarly, a measurement report transmitted by UE2 contains a D2D ID of the UE2 as a source D2D ID, and a D2D ID of the UE1 as a destination D2D ID.

When the eNB 530 receives a measurement report from at least one of the UE1 and UE2, it may operate a measurement report reception timer (MR Reception Timer) to receive a measurement report from the other UE that has not transmitted a measurement report.

When the eNB 530 has received measurement reports from the two UE devices before the MR Reception Timer has expired, it is capable of determining whether the network IDs of the respective UE devices are linked to a direct path using the D2D IDs.

After that, the eNB 530 matches information items contained in the measurement reports received from the UE1 and UE2, e.g., source D2D IDs and destination D2D IDs in the individual measurement reports, with each other, in operation S565. Afterwards, the eNB 530 determines whether it switches a direct path to a local path.

When the eNB 530 determines to switch a direct path to a local path, it is capable of transmitting, to the UE1 and UE2, an RRC connection re-configuration message containing a command for switching to a local path in operation S570. In that case, the UE1 and UE2 transmit, to the eNB 530, an RRC connection re-configuration completing message containing information that local path switching has been completed in operation S575.

In that case, the UE1 and UE2 are capable of transmission/reception of data packets via a local path passing through the eNB 530.

Figure 6:
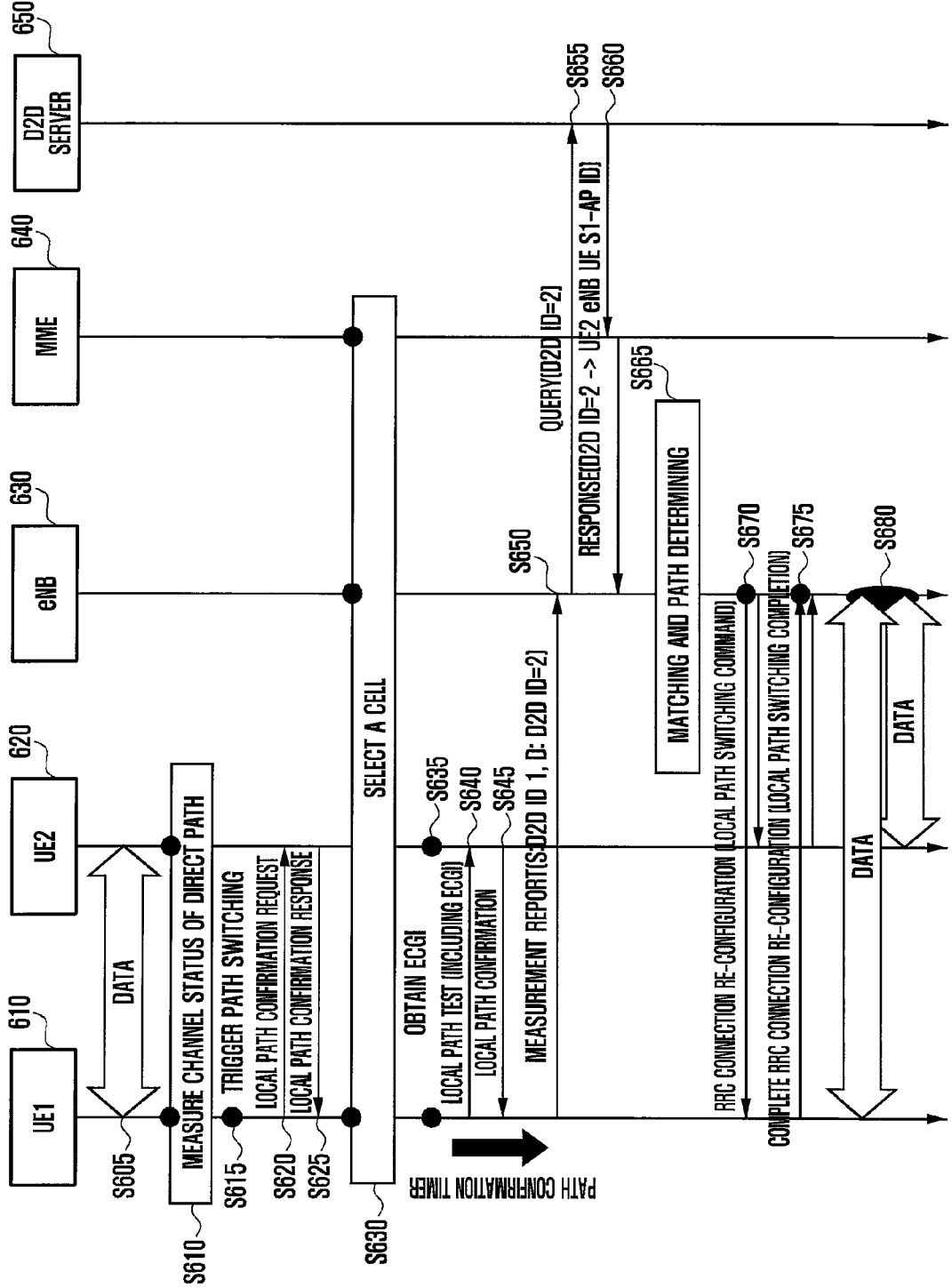
FIG. 6 is a flow diagram that describes a data packet path switching method according to another embodiment of the present invention.

FIG. 6 is a flow diagram that describes a data packet path switching method according to another embodiment of the present invention.

The embodiment of FIG. 6 is similar to that of FIG. 5 because UE 610 shares its ECGI with the correspondent UE 620. The embodiment of FIG. 6 is also similar to that of FIG. 3 in that an eNB 630 queries a D2D server 650 to obtain a network ID of the correspondent UE 620.

A first UE device, UE1, indicated by reference number 610, and a second UE device, UE2, indicated by reference number 620, communicate with each other via a direct path in operation S605.

UE1 or UE2 measures a channel status of the direct path in operation S610. UE1 or UE2 determines whether a preset measurement report satisfies a triggering condition in operation S615.

When a preset measurement report satisfies a triggering condition in operation S615, the UE1 and UE2 trigger a path switching. After triggering a path switching, the UE1 transmits a local path confirmation request to the UE2 to confirm the local path in operation S620.

The UE2 transmits the local path confirmation response to the UE1 in operation S625. In that case, the UE1 and UE2 enter an RRC connection state in operation S630.

When the UE1 and UE2 operate in an RRC connection state, the embodiment may be implemented without operation S630.

When the UE1 and UE2 enter an RRC connection state, they are capable of obtaining eNB IDs (e.g., ECGI) respectively, in operation S635. When the UE1 and UE2 have been in an RRC connection state, they will have been equipped with the connected, eNB IDs, respectively.

After that, the UE1 is capable of transmitting, to the UE2, a local path test message containing an eNB ID (ECGI) that the UE1 has connected to, in operation S640. The UE2, as a correspondent UE, determines whether the eNB ID transmitted from the UE1 is identical to the ID of an eNB that the UE2 has connected to.

When the eNB ID transmitted from the UE1 is identical to the ID of an eNB that the UE2 has connected to, the UE2 transmits a local path confirmation response to the UE1 in operation S645.

In the embodiment, the UE1 transmits a local path test message to the UE2, and then operates a path confirmation timer. When the UE1 does not receive a local path confirmation response from the UE2 until the path confirmation timer has expired, the UE1 may independently request to independently switch between paths.

When the UE1 and UE2 are connected to the same eNB, the UE1 and UE2 are capable of transmitting the respective measurement reports to the eNB 630.

The method of transmitting measurement reports is similar to the embodiment shown in FIG. 3.

More specifically, the UE1 is capable of transmitting a measurement report to the serving eNB 630 in operation S650.

In the embodiment, the measurement report may contain a D2D ID of UE1 and a D2D ID of the correspondent UE communicating via a direct path, i.e., a D2D ID of UE2.

When receiving the measurement report from the UE, the eNB 630 transmits a query message, Query, to the D2D server 650 in order to obtain a network ID (or a cell ID) corresponding to the D2D ID in operation S655.

After receiving the query message from the eNB 630, the D2D server 650 transmits its stored network ID to the eNB 630 or receives corresponding information from an entity that contains the D2D ID and the network ID and then transmits the query response message, Query Response, to the eNB 630 in operation S660.

According to an embodiment, the eNB may not have included a network ID (e.g., IMSI) of the correspondent UE 620 (UE2) that the D2D server 650 has known. In this case, the D2D server 650 may request the MME 640 to convert a network ID that the D2D server has known into a network ID of the UE that the eNB has known in operation S660.

The MME 640 may transmit, to the eNB 630, a network ID of the UE that the eNB 630 has known. In LTE, an example of the network ID may be an eNB UE S1-AP ID.

The eNB 630 receives a D2D ID of the correspondent UE 620 and a network ID of UE corresponding thereto via the response message and matches the IDs with each other in operation S665. The eNB 630 determines whether it switches a direct path to a local path.

When the eNB 630 determines to switch a direct path to a local path, it is capable of transmitting, to the UE1 and UE2, an RRC connection re-configuration message containing a command for switching to a local path in operation S670. In that case, the UE1 and UE2 transmit, to the eNB 630, an RRC connection re-configuration completing message containing information that local path switching has been completed in operation S675.

In that case, the UE1 and UE2 are capable of transmission/reception of data packets via a local path passing through the eNB 630, in operations S675 and S680.

Figure 7:
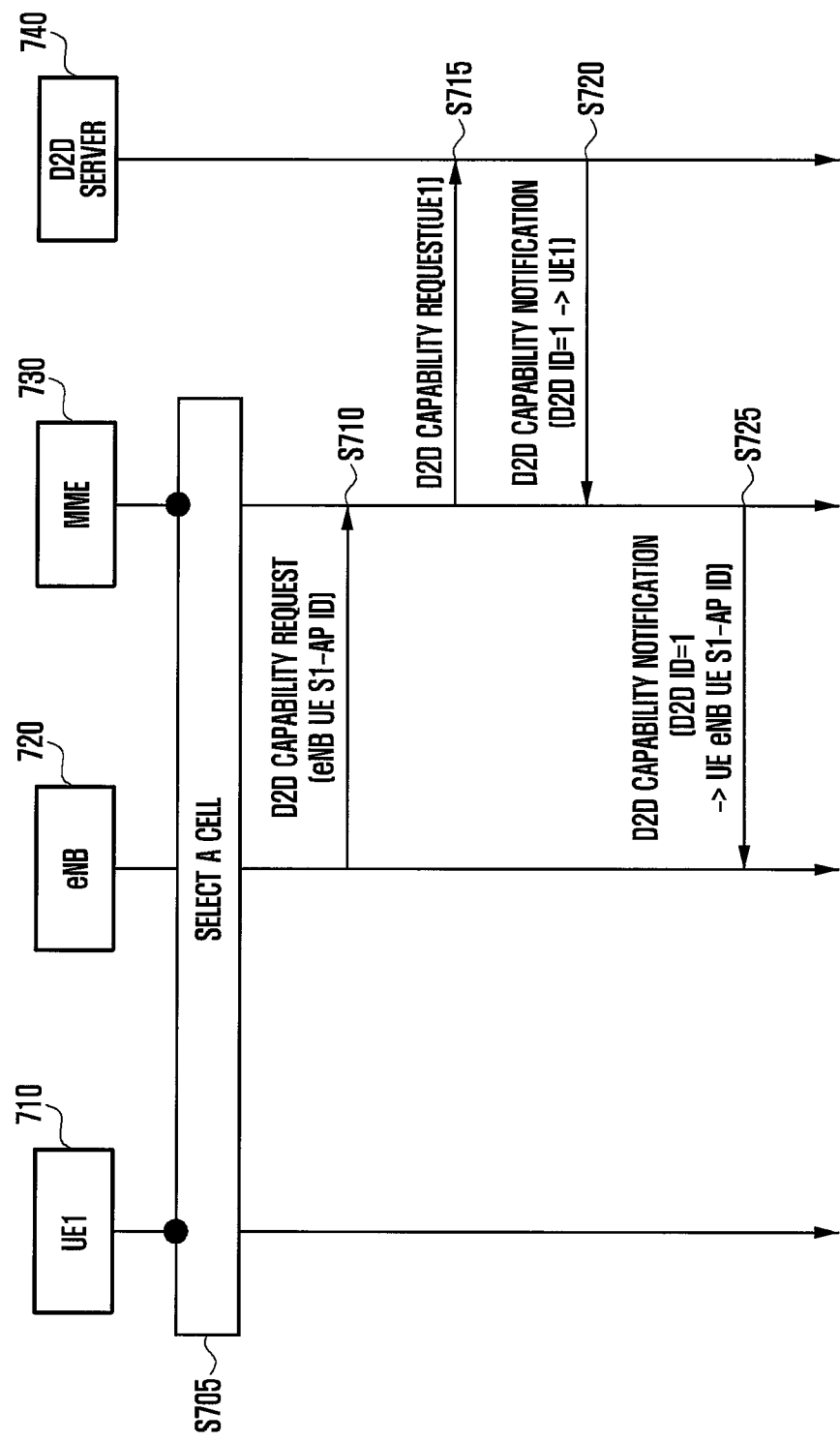
FIG. 7 is a flow diagram that describes a method for an eNB to obtain a D2D ID of a UE device from a D2D server according to an embodiment of the present invention.

FIG. 7 is a flow diagram that describes a method for an eNB to obtain a D2D ID of a UE device from a D2D server according to an embodiment of the present invention.

UE1, indicated by reference number 710, is connected to an eNB 720 via a cell section process in operation S705.

The eNB 720 transmits a message, D2D capability Request, to an MME 730 in operation S710. The D2D capability Request message contains an ID of the UE 710 that the eNB 720 and the MME 730 have known. An example of the UE ID may be an eNB UE S1-AP ID.

After that, the MME 730 converts an eNB UE S1-AP ID into an IMSI and transmits the IMSI to the D2D server 740 in operation S715. The D2D server 740 notifies the MME 730 of a D2D ID of the UE 710 corresponding to the received IMSI via a message, D2D Capability Notification.

The MME 730 notifies the eNB 720 of a D2D ID and an eNB UE S1-AP ID of the UE 710 via a message, D2D Capability Notification, in operation S725.

The eNB 720 may have a pair of a network ID and a D2D ID of the UE 710.

Figure 8:
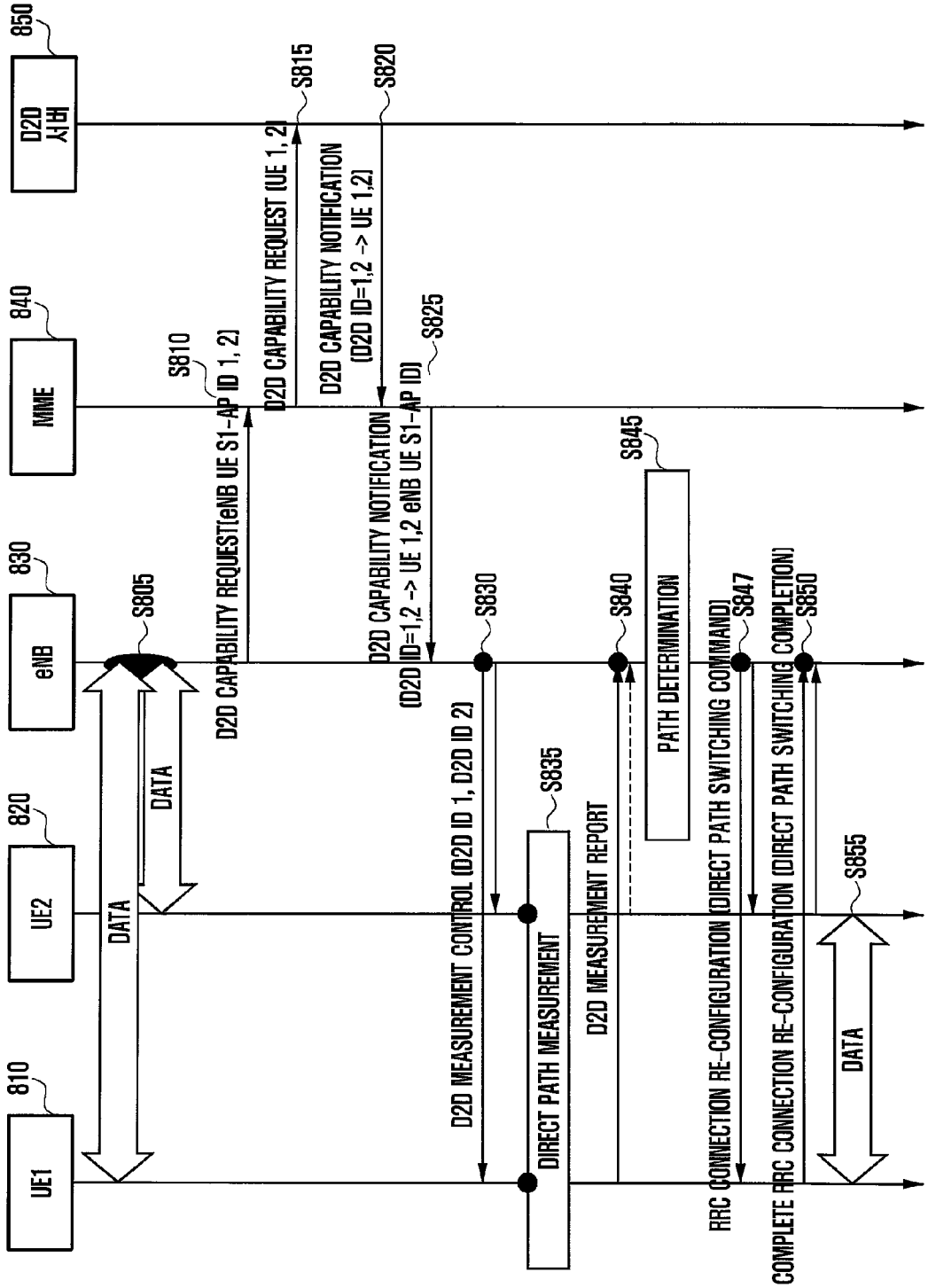
FIG. 8 is a flow diagram that describes a method of switching a local path to a direct path according to an embodiment of the present invention.

FIG. 8 is a flow diagram that describes a method of switching a local path to a direct path according to an embodiment of the present invention.

FIG. 8 shows a detailed method for an eNB to obtain D2D IDs of individual UE devices and to instruct the UE devices to switch a local path to a direct path.

A first UE device, UE1, indicated by reference number 810, and a second UE device, UE2, indicated by reference number 820, communicate with each other via a local path passing through an eNB 830 in operation S805. The eNB 830 may determine to switch a local path to a direct path between the UE1 and UE2 due to any cause. For example, when the eNB 830 detects the improvement of a channel status of the direct path between the UE1 and UE2 or enters an overload state, it may determine whether to perform D2D direct communication.

When the eNB 830 determine to perform D2D direct communication, it is capable of transmitting a message, D2D capability Request, to an MME 840 in operation S810. The D2D capability Request message may contain network identifiers of UE devices, e.g., an eNB UE S1-AP ID 1 as a network identifier of the UE1, and an eNB UE S1-AP ID 2 as a network identifier of the UE2.

The MME 840 converts the network IDs of the individual UE devices into IMSIs and transmits the IMSIs to the D2D server 850 in operation S815.

The D2D server 850 notifies the MME 840 of D2D IDs of the UE devices corresponding to the received IMSIs via a message, D2D Capability Notification, in operation S820.

The MME 840 notifies the eNB 830 of a D2D ID 1 and an eNB UE S1-AP ID 1 of the UE1 and a D2D ID 1 and an eNB UE S1-AP ID 2 of the UE2, via a message, D2D Capability Notification, in operation S825.

In that case, the eNB 830 is capable of obtaining D2D IDs of the UE1 and UE2 that are performing D2D direct communication with each other.

After that, the eNB 830 is capable of controlling D2D measurement of the individual UE devices in operation S830. For example, the eNB 830 may instruct the individual UE devices to measure channels for direct communication based on D2D IDs, and to report the measurements.

The UE1 and UE2 measure the direct path according to the control of the eNB 830 in operation S835. The UE1 and UE2 report the measurement results to the eNB 830 in operation S840.

The eNB 830 is capable of determining whether it switches the current local path to a direct path, based on the measurement results of the UE1 and UE2 in operation S845. For example, the eNB 830 is capable of comparing channel statuses between each of the UE1 and UE2 and the eNB 830 with a channel status between the UE1 and UE2 to determine whether it switches the current local path to a direct path.

When the eNB 830 determines to switch the current local path to a direct path, it is capable of transmitting, to the UE1 and UE2, an RRC connection re-configuration message instructing to switch the current local path to a direct path in operation S847. The RRC connection re-configuration message may contain a direct path parameter.

In that case, the UE1 and UE2 transmit, to the eNB 830, an RRC connection re-configuration completing message, in response to the received RRC connection re-configuration message. The RRC connection re-configuration completing message may contain a default path completing parameter. After that, the UE devices communicate with each other via the direct path.

Figure 9:
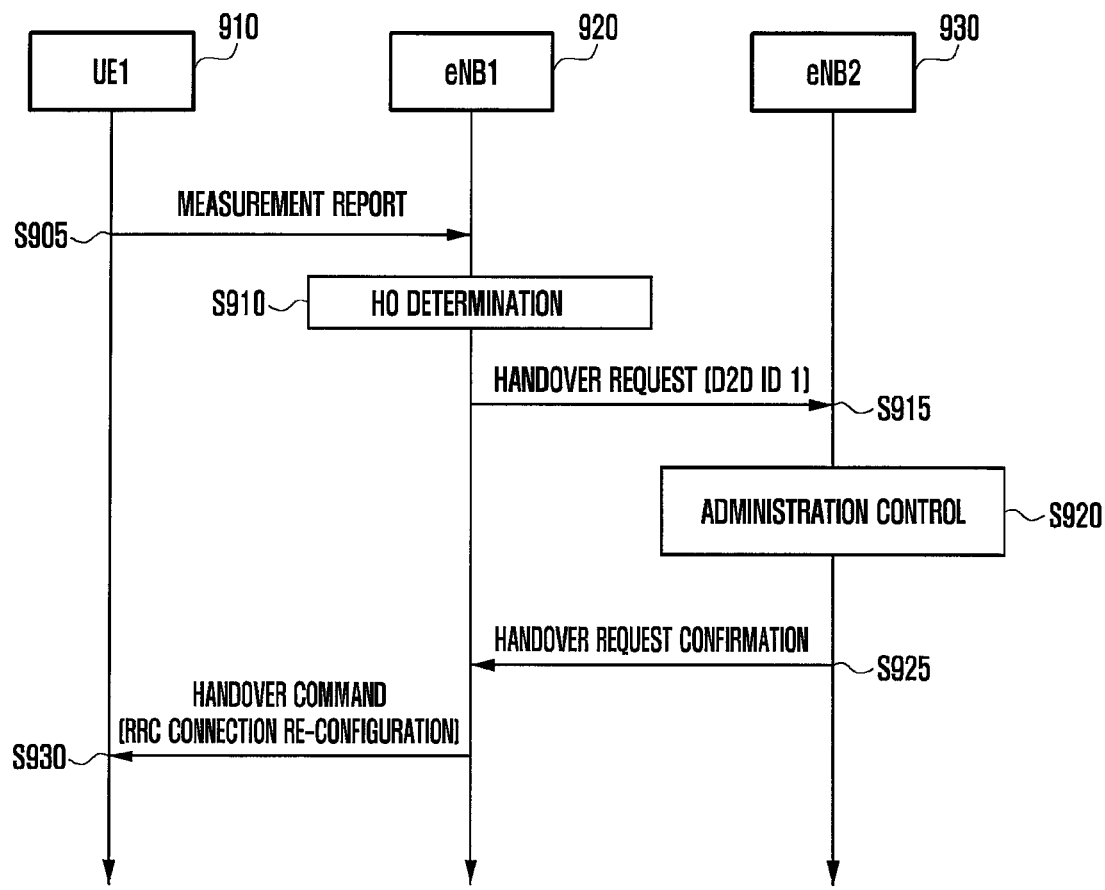
FIG. 9 is a flow diagram that describes a method for a serving eNB to transmit, when performing a handover for a UE device, the D2D ID of the UE device to a target eNB according to an embodiment of the present invention.

FIG. 9 is a flow diagram that describes a method for a serving eNB to transmit, when performing a handover for a UE device, the D2D ID of the UE device to a target eNB according to an embodiment of the present invention.

FIG. 9 shows a detailed method where an eNB with a D2D ID of a UE device includes the D2D ID in a handover request message and performs transmission of the handover request in order to perform handover.

When UE1, indicated by reference number 910, satisfies a specific condition, for example, when UE1 measures a channel status of the adjacent eNB as the channel status to be better than that of the current serving eNB, the UE1 is capable of transmitting the measurement report to the current serving eNB 920 in operation S905.

The serving eNB 920 is capable of determining whether it performs a handover of the UE1 in operation S910. When the serving eNB 920 has secured a D2D ID of the UE1, it is capable of transmitting, to a target eNB 920, a handover request message containing the D2D ID of the UE1.

The target eNB 920 performs admission control in operation S920, and transmits a handover request confirmation message to the serving eNB 920 in operation S925.

The serving eNB 920 transmits, to the UE1, a handover command message (or an RRC connection re-configuration message) in operation S930.

Figure 10:
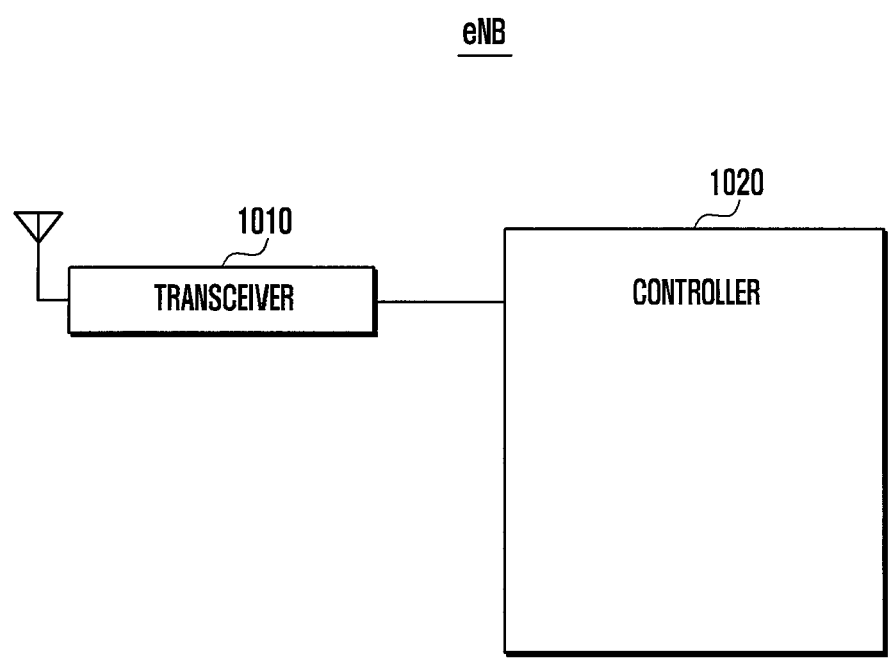
FIG. 10 is a block diagram showing an eNB according to embodiments of the present invention.

FIG. 10 is a block diagram showing an eNB according to embodiments of the present invention. Referring to FIG. 10, the eNB is capable of including a transceiver 1010 and a controller 1020.

The transceiver 1010 is capable of transmitting/receiving signals to/from UE or a node of a wireless communication system. For example, the transceiver 1010 is capable of establishing a wireless channel with UE and transmitting/receiving control information or data to/from UE via the channel. The eNB is capable of transmitting control information or data, received from UE, to the correspondent UE communicating with the UE: directly, not passing through a core network, which is a local path; or through a core network, which is a default path.

The controller 1020 controls flow of signals between the blocks to perform operations of the eNB.

The controller 1020 is capable of performing operations of the embodiments described above, referring to the drawings. For example, when the controller 1020 receives, from a first UE device, a measurement report containing a D2D ID of a second UE device performing direct communication with the first UE device, it is capable of querying a D2D server regarding a network ID corresponding to the D2D ID of the second UE device. The controller 1020 is capable of determining whether it switches a direct path to a local path between the first and second UE devices, based on the network ID of the second UE device obtained from the D2D server.

In another embodiment of the present invention, the controller 1020 is capable of receiving, from a first UE device, a first measurement report containing a D2D ID of the first UE device and a D2D ID of a second UE device performing direct communication with the first UE device. The controller 1020 is capable of receiving, from the second UE device, a second measurement report containing the D2D ID of the second UE device and the D2D ID of the first UE device. The controller 1020 is capable of determining whether it switches a direct path to a local path between the first and second UE devices, based on the first and second measurement reports.

In another embodiment of the present invention, the controller 1020 is capable of controlling a local path for communication between first and second UE devices. When the controller 1020 determines to switch a local path to a direct path between the first and second UE devices, it is capable of transmitting, to an MME, a D2D capability request message containing network IDs of the first and second UE devices. In response to the D2D capability request message, the controller 1020 is capable of receiving, from the MME, the D2D capability notification message containing D2D IDs of the first and second UE devices, and switching the local path to a direct path based on the received D2D IDs of the first and second UE devices.

In another embodiment of the present invention, the controller 1020 may also transmit a D2D ID of UE to a target eNB during the handover.

Figure 11:
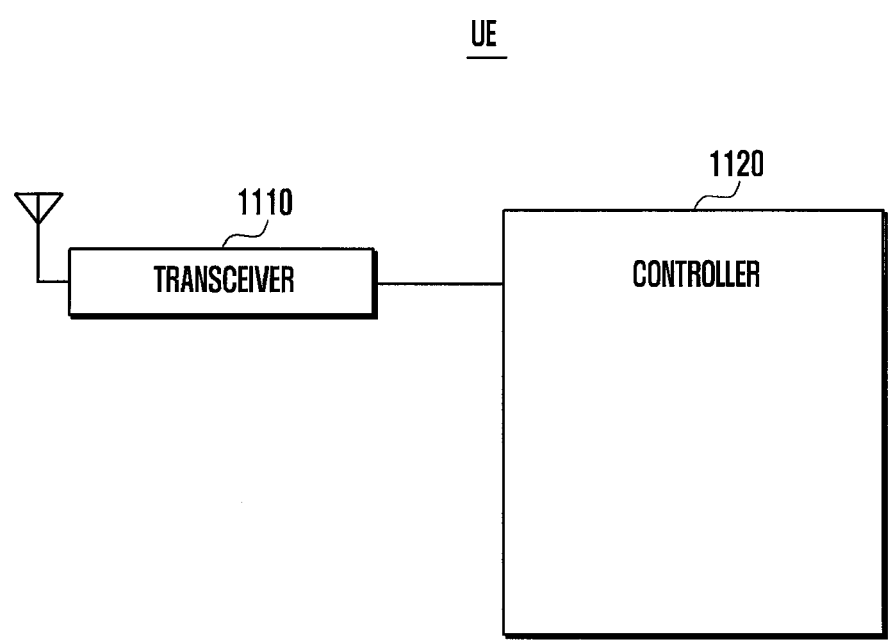
FIG. 11 is a block diagram showing a user equipment device according to embodiments of the present invention.

FIG. 11 is a block diagram showing user equipment (UE) according to embodiments of the present invention. As shown in FIG. 11, the UE is capable of including a transceiver 1110 and a controller 1120.

The transceiver 1110 is capable of establishing a wireless channel with an eNB and transmitting/receiving signals to/from the eNB via the channel. For example, the transceiver 1110 is capable of establishing a wireless channel with an eNB and transmitting/receiving control information or data to/from the eNB via the channel.

The controller 1120 controls flow of signals between the blocks to perform operations of the UE.

For example, the controller 1120 of the UE is capable of communicating with the correspondent UE via a direct path, obtaining an eNB ID of an eNB to which the UE is connected, and transmitting, to the correspondent UE, a local path test message containing the eNB ID. When the controller 1120 receives, from the correspondent UE, a local path confirmation response message in response to the local path test message, it is capable of transmitting the measurement report to the eNB. When the controller 1120 receives, from the eNB, a Radio Resource Control (RRC) connection re-configuration message instructing to switch the direct path to a local path, it is capable of switching the direct path to a local path.

In another embodiment of the present invention, the controller 1120 is capable of creating a measurement report containing information regarding D2D IDs of the correspondent UE and the UE or a D2D ID of the correspondent UE, during the D2D communication, and transmitting the report to the eNB. The eNB is capable of determining whether it switches the direct path to a local path, based on the measurement report.

As described above, the present invention enables an eNB (base station) to identify user equipment (UE) and the involved links when switching between a direct path and a local path to perform a device-to-device (D2D) communication, thereby efficiently switching between communication paths.

The embodiments of the present invention described in the description and drawings are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

The invention claimed is:

1. A method for a base station to switch between paths in a wireless communication system configured to support device-to-device (D2D) communication comprising:
   receiving, from a first terminal, a measurement report including a D2D identification (D2D ID) of a second terminal that performs D2D communication with the first terminal;
   querying a D2D server regarding a network identification (ID) corresponding to the D2D ID of the second terminal; and
   determining whether to switch a direct path to a local path between the first and second terminals, based on the network ID of the second terminal, obtained from the D2D server, wherein the direct path is a direct wireless communication path between the first terminal and the second terminal, and the local path is a relay wireless communication path between the first terminal and the second terminal.

2. The method of claim 1, further comprising:
   transmitting, to the first and second terminals, a radio resource control (RRC) connection re-configuration message instructing to switch the direct path to a local path; and
   matching the network ID of the second terminal with the D2D ID of the second terminal and storing a result of the matching.

3. A method for a base station to switch between paths in a wireless communication system configured to support device-to-device (D2D) communication comprising:
   receiving, from a first terminal, a first measurement report including a D2D identification (D2D ID) of a second terminal that performs D2D communication with the first terminal, and an D2D ID of the first terminal;
   receiving, from the second terminal, a second measurement report including the D2D ID of the first terminal, and the D2D ID of the second terminal; and
   determining whether to switch a direct path to a local path between the first and second terminals, based on the first and second measurement reports, wherein the direct path is a direct wireless communication path between the first terminal and the second terminal, and the local path is a relay wireless communication path between the first terminal and the second terminal.

4. The method of claim 3, wherein:
   the first measurement report sets the D2D ID of the first terminal as a source and the D2D ID of the second terminal as a destination;
   the second measurement report sets the D2D ID of the second terminal as a source and the D2D ID of the first terminal as a destination; and
   determining whether to switch a direct path to a local path between the first and second terminals comprises matching the source ID and the destination ID, set in the first measurement report, with the source ID and the destination ID, set in the second measurement report.

5. The method of claim 3, further comprising:
   operating a measurement report (MR) reception timer after receiving the first measurement report; and
   when the second measurement report is not received until the timer has expired, stopping the path switching process,
   wherein the first or second measurement report comprises information regarding a failure recovery indicator instructing an operator for setting a default path.

6. A method for a first terminal to switch between paths in a wireless communication system configured to support device-to-device (D2D) communication comprising:
   communicating with a second terminal via a direct path;
   obtaining an identification of a base station (base station ID) in connection with the first terminal;
   transmitting, to the second terminal, a local path test message including the base station ID;
   transmitting a measurement report to the base station, when receiving, from the second terminal, a local path confirmation response message in response to the local path test message; and
   switching the direct path to a local path, when receiving, from the base station, a radio resource control (RRC) connection re-configuration message instructing to switch the direct path to a local path, wherein the direct path is a direct wireless communication path between the first terminal and the second terminal, and the local path is a relay wireless communication path between the first terminal and the second terminal.

7. The method of claim 6, wherein: the local path confirmation response message is received from the second terminal when a base station ID stored in the second terminal is identical to a base station ID stored in the local path test message; and the measurement report sets a D2D ID of the first terminal to a source and a D2D ID of the second terminal to a destination.

8. A method for a base station to switch between paths in a wireless communication system configured to support device-to-device (D2D) communication comprising:
   providing a local path for communication between first and second terminals;
   transmitting, to a mobile management entity (MME), a D2D capability request message including network identifications (network IDs) of the first and second terminals, when determining to switch the local path to a direct path between the first and second terminals;
   receiving, from the MME, a D2D capability notification message including D2D IDs of the first and second terminals, in response to the transmission of the D2D capability request message; and
   switching the local path to a direct path based on the D2D IDs of the first and second terminals, wherein the direct path is a direct wireless communication path between the first terminal and the second terminal, and the local path is a relay wireless communication path between the first terminal and the second terminal.

9. The method of claim 8, further comprising:
   instructing the first and second terminals to measure the D2D channels of the first and second terminals, based on the D2D IDs of the first and second terminals, and to report the measurements; and determining to switch the local path to a direct path based on the measurement reports transmitted from the first and second terminals according to the instruction.

10. A base station for controlling path switching in a wireless communication system configured to support device-to-device (D2D) communication comprising:
a transceiver configured to transmit or receive signals to or from a node of the wireless communication system or terminals; and
a controller comprising hardware and coupled with the transceiver, the controller configured to:
receive, from a first terminal, a measurement report including a D2D identification (D2D ID) of a second terminal that performs D2D communication with the first terminal;
query a D2D server regarding a network identification (ID) corresponding to the D2D ID of the second terminal;
determine whether to switch a direct path to a local path between the first and second terminals based on the network ID of the second terminal obtained from the D2D server;
match the network ID of the second terminal with the D2D ID of the second terminal and storing a result of the matching; and
transmit, to the first and second terminals, a radio resource control (RRC) connection re-configuration message instructing to switch the direct path to a local path, wherein the direct path is a direct wireless communication path between the first terminal and the second terminal, and the local path is a relay wireless communication path between the first terminal and the second terminal.

11. A base station for controlling path switching in a wireless communication system configured to support device-to-device (D2D) communication comprising:
a transceiver configured to transmit or receive signals to or from a node of the wireless communication system or terminals; and
a controller comprising hardware and coupled with the transceiver, the controller configured to:
receive, from a first terminal, a first measurement report including a D2D identification (D2D ID) of a second terminal that performs D2D communication with the first terminal and a D2D ID of the first terminal;
receive, from the second terminal, a second measurement report including the D2D ID of the first terminal and the D2D ID of the second terminal; and
determine whether to switch a direct path to a local path between the first and second terminals based on the first and second measurement reports, wherein the direct path is a direct wireless communication path between the first terminal and the second terminal, and the local path is a relay wireless communication path between the first terminal and the second terminal.

12. The base station of claim 11, wherein:
the first measurement report sets the D2D ID of the first terminal as a source and the D2D ID of the second terminal as a destination;
the second measurement report sets the D2D ID of the second terminal as a source and the D2D ID of the first terminal as a destination;
the hardware controller is further configured to match the source ID and the destination ID, set in the first measurement report, with the source ID and the destination ID, set in the second measurement report, and store the matched result;
the first or second measurement report comprises information regarding a failure recovery indicator instructing an operator for setting a default path; and
the hardware controller is further configured to operate a measurement report (MR) reception timer after receiving the first measurement report, stop the path switching process when the second measurement report is not received until the timer has expired, and transmit, to the first and second terminals, a radio resource control (RRC) connection re-configuration message instructing to switch the direct path to a local path.

13. A first terminal for switching between paths in a wireless communication system configured to support device-to-device (D2D) communication comprising:
a transceiver configured to transmit or receive signals to/from a base station or a second terminal; and
a controller configured to:
communicate with the second terminal via a direct path;
obtain an identification of a base station (base station ID) in connection with the first terminal;
transmit, to the second terminal, a local path test message including the base station ID;
transmit a measurement report to the base station, when receiving, from the second terminal, a local path confirmation response message in response to the local path test message; and
switch the direct path to a local path, when receiving, from the base station, a radio resource control (RRC) connection re-configuration message instructing to switch the direct path to a local path,
wherein:
the local path confirmation response message is received from the second terminal when a base station ID stored in the second terminal is identical to a base station ID stored in the local path test message; and
the measurement report sets a D2D ID of the first terminal to a source and a D2D ID of the second terminal to a destination, wherein the direct path is a direct wireless communication path between first terminal and the second terminal, and the local path is a relay wireless communication path between the first terminal and the second terminal.

14. A base station for controlling path switching in a wireless communication system configured to support device-to-device (D2D) communication comprising:
a transceiver configured to transmit or receive signals to or from a node of the wireless communication system or terminals; and
a controller configured to:
provide a local path for communication between first and second terminals;
transmit, to a mobile management entity (MME), a D2D capability request message including network identifications (network IDs) of the first and second terminals, when determining to switch the local path to a direct path between the first and second terminals;
receive, from the MME, a D2D capability notification message including D2D IDs of the first and second terminals, in response to the transmission of the D2D capability request message;

switch the local path to a direct path based on the D2D IDs of the first and second terminals;

instruct the first and second terminals to measure the D2D channels of the first and second terminals based on the D2D IDs of the first and second terminals and to report the measurements; and determine to switch the local path to a direct path based on the measurement reports transmitted from the first and second terminals according to the instruction, wherein the direct path is a direct wireless communication path between the first terminal and the second terminal, and the local path is a relay wireless communication path between the first terminal and the second terminal.

\* \* \* \* \*